(12) United States Patent
Hara (10) Patent No.: US 7,898,683 B2
(45) Date of Patent: Mar. 1, 2011

(54) IMAGE PROCESSING APPARATUS, CONTROL METHOD FOR THE SAME, AND COMPUTER-READABLE MEDIUM STORING A COMPUTER PROGRAM FOR PREVENTING DOWNLOADING OF RESOURCES DATA WHEN A PRINT JOB EXISTS

(75) Inventor: Katsuhiko Hara, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1498 days.

(21) Appl. No.: 10/692,327

(22) Filed: Oct. 23, 2003

(65) Prior Publication Data

US 2004/0184076 A1   Sep. 23, 2004

(30) Foreign Application Priority Data

Oct. 23, 2002 (JP) .............................. 2002-308727

(51) Int. Cl.
*G06K 15/00* (2006.01)
*G06F 3/12* (2006.01)
(52) U.S. Cl. ..................................... 358/1.16; 358/1.15
(58) Field of Classification Search ................. 358/1.1, 358/1.8, 1.13, 1.15, 448, 402, 1.14, 1.16
See application file for complete search history.

(56) References Cited

U.S. PATENT DOCUMENTS

| | | | | | |
|---|---|---|---|---|---|
| 7,154,617 | B2* | 12/2006 | Ikeno | ......................... | 358/1.13 |
| 7,239,409 | B2* | 7/2007 | Parry | ......................... | 358/1.15 |
| 2003/0011816 | A1* | 1/2003 | Ikeno | ......................... | 358/1.15 |
| 2003/0225726 | A1* | 12/2003 | Simpson et al. | ................. | 707/1 |
| 2004/0024844 | A1* | 2/2004 | Holmstead | ................... | 709/219 |

* cited by examiner

*Primary Examiner* — Gabriel I Garcia
(74) *Attorney, Agent, or Firm* — Rossi, Kimms & McDowell LLP (57) ABSTRACT

There is provided an image processing apparatus that is capable of protecting a received plurality of pieces of resource data against corruption. Print jobs transmitted from a plurality of information processing apparatuses are stored. When a download start request for resource data has been received by the communication device from one of the plurality of information processing apparatuses, it is determined whether a print job received by the communication device from one of a plurality of information processing apparatuses exists in the storage device. When the received print job exists in the storage device, the communication device is controlled to inform one of the plurality of information processing apparatuses that downloading of the resource data is not possible.

11 Claims, 9 Drawing Sheets

IMAGE PROCESSING APPARATUS, CONTROL METHOD FOR THE SAME, AND COMPUTER-READABLE MEDIUM STORING A COMPUTER PROGRAM FOR PREVENTING DOWNLOADING OF RESOURCES DATA WHEN A PRINT JOB EXISTS

BACKGROUND OF THE INVENTION

1. Field of the Invention

The present invention relates to an image processing apparatus, such as a laser printer or other types of printer, a digital copier, and a facsimile machine, a control method for the same, and a program for implementing the control method. In particular, the present invention relates to an image processing apparatus that downloads resource data, such as fonts, from an information processing apparatus connected via a network, a control method for the same, and a program for implementing the control method.

2. Description of the Related Art

In a conventional image processing apparatus having a plurality of functions such as print, copy, and facsimile, it is possible to simultaneously receive a plurality of jobs, such as a print job and a copy job or a copy job and a facsimile receive job and to process such jobs in parallel. Aside from receiving a plurality of jobs, it is also possible to receive (download) resource data, such as fonts, an overlay, and a program, via a network from a host computer as an information processing apparatus.

However, in the conventional image processing apparatus, if resource data relating to fonts being used in printing is downloaded during execution of a print job, there is the danger of the fonts being changed midway through printing.

Also, as described above, since the image processing apparatus is capable of processing a plurality of jobs in parallel, if a plurality of pieces of resource data are simultaneously downloaded from a plurality of host computers, the plurality of pieces of resource data will be received simultaneously, so that there is the danger of the resource data being corrupted.

SUMMARY OF THE INVENTION

It is an object of the present invention to provide an image processing apparatus that is capable of protecting resource data against corruption or preventing problems such as fonts changing midway through printing, a control method for the same, and a program for implementing the control method.

To attain the above object, in a first aspect of the present invention, there is provided an image processing apparatus comprising a communication device that communicates with a plurality of information processing apparatuses, a storage device that stores at least one of print job transmitted from at least one of the plurality of information processing apparatuses, a determination device operable when a download start request for resource data has been received by the communication device from one of a plurality of information processing apparatuses, to determine whether a print job received by the communication device from at least one of the plurality of information processing apparatuses exists in the storage device, and a control device operable when the received print job exists in the storage device, to control the communication device to inform one of the plurality of information processing apparatuses that downloading of the resource data is not possible.

With the image processing apparatus according to the first aspect, when a download start request for resource data has been received from another information processing apparatus, it is determined whether a print job received by the communication device from the second information processing apparatus exists in the DRAM 116. When the received print job exists, the first information processing apparatus is informed that downloading of the resource data is not possible, so that resource data is not downloaded from the first information processing apparatus during execution of a print job, which makes it possible to avoid downloading resource data midway through printing.

Preferably, when the received print job does not exist in the storage device, the control device controls the communication device to download the resource data.

Preferably, when the communication device has informed one of the plurality of information processing apparatuses that downloading of the resource data is not possible, the control device controls the communication device so as not to receive another print job.

To attain the above object, in a second aspect of the present invention, there is provided an image processing apparatus, comprising a communication device that communicates with a plurality of information processing apparatuses, a storage device that stores resource data downloaded from at least one of the plurality of information processing apparatuses, a determination device operable when a download start request for first resource data has been received by the communication device from one of a plurality of information processing apparatuses after second resource data by the communication device from at least one of the plurality of information processing apparatuses has been downloaded, to determine whether the second resource data is presently being written into the storage device, and a control device operable when the second resource data is being written into the storage device, to control the communication device to inform one of the plurality of information processing apparatus that downloading of the first resource data is not possible.

With the image processing apparatus according to the second aspect, when a download start request for first resource data has been received by the communication device from the first information processing apparatus after second resource data by the communication device from the second information processing apparatus has been downloaded, it is determined whether the downloaded or second resource data is presently being written into the storage device, and when the downloaded resource data is being written, the first information processing apparatus is informed that downloading of the first resource data is not possible, so that a plurality of pieces of resource data are not received simultaneously and the resource data can be protected against corruption.

Preferably, when the second resource data has been completely written in the storage device, the control device controls the communication device to download the first resource data.

To attain the above object, in a third aspect of the present invention, there is provided a method of controlling an image processing apparatus including a storage device that stores at least one print job transmitted from at least one of a plurality of information processing apparatuses, the method comprising steps of determining, when a download start request for resource data has been received from one of a plurality of information processing apparatuses, whether a print job received from at least one of the plurality of information processing apparatuses exists in the storage device, and when the received print job exists in the storage device, informing one of the plurality of information processing apparatuses that downloading of the resource data is not possible.

To attain the above object, in a fourth aspect of the present invention, there is provided a method of controlling an image processing apparatus including a storage device that stores resource data downloaded from at least one of a plurality of information processing apparatuses, the method comprising steps of determining, when first resource data has been received from one of a plurality of information processing apparatuses after second resource data from at least one of the plurality of information processing apparatuses has been downloaded, whether the second resource data is presently being written into the storage device, and when the second resource data is being written into the storage device, informing one of the plurality of information processing apparatus that downloading of the first resource data is not possible.

To attain the above object, in a fifth aspect of the present invention, there is provided a program that executes a method of controlling an image processing apparatus including a storage device that stores at least one print job transmitted from at least one of a plurality of information processing apparatuses, the method comprising steps of determining, when a download start request for resource data has been received from one of a plurality of information processing apparatuses, whether a print job received from at least one of the plurality of information processing apparatuses exists in the storage device, and when the received print job exists in the storage device, informing one of the plurality of information processing apparatuses that downloading of the resource data is not possible.

To attain the above object, in a sixth aspect of the present invention, there is provided a program that executes a method of controlling an image processing apparatus including a storage device that stores resource data downloaded from at least one of a plurality of information processing apparatuses, the method comprising steps of determining, when first resource data has been received from one of a plurality of information processing apparatuses after second resource data from at least one of the plurality of information processing apparatuses has been downloaded, whether the second resource data is presently being written into the storage device, and when the second resource data is being written into the storage device, informing one of the plurality of information processing apparatus that downloading of the first resource data is not possible.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
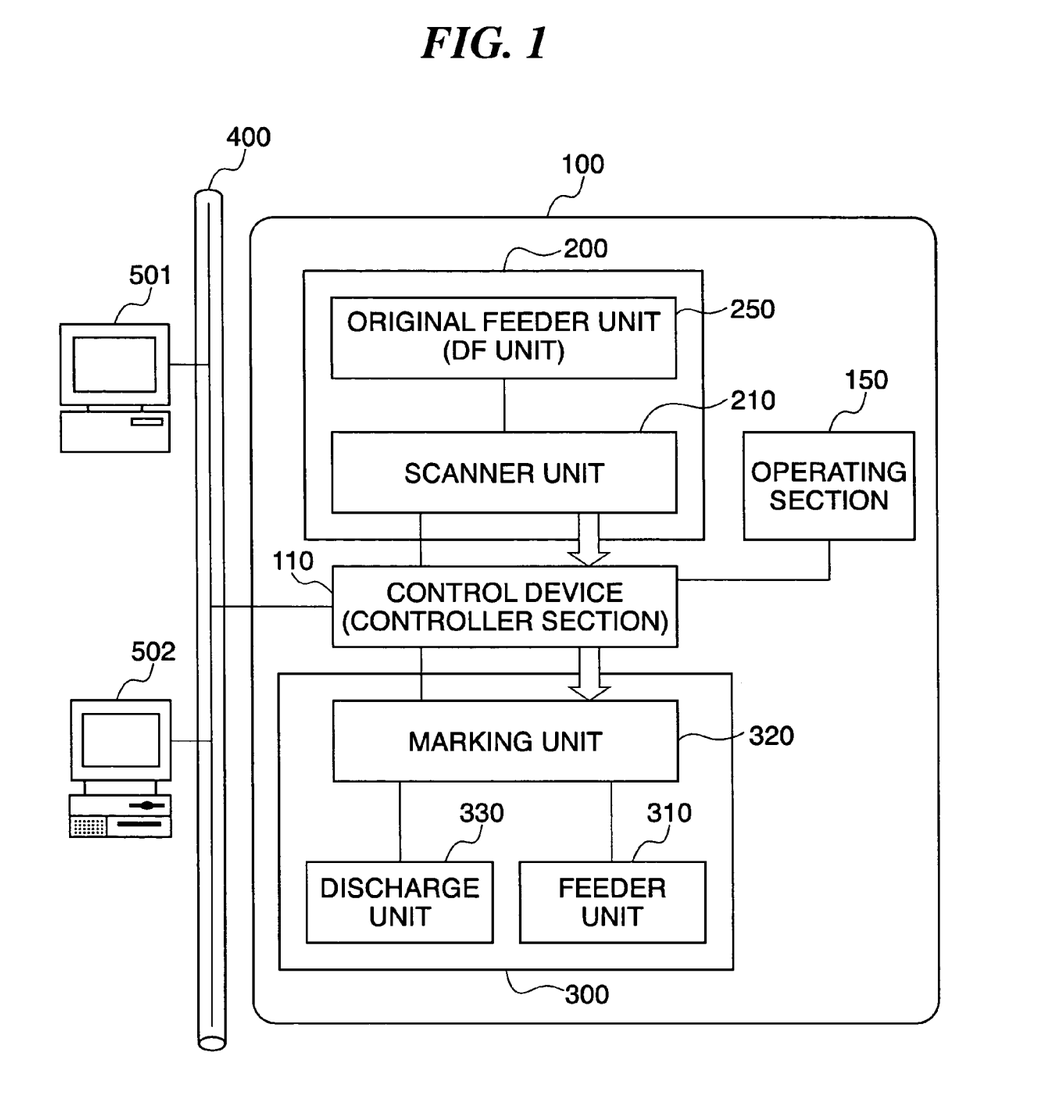
FIG. 1 is a block diagram showing the overall construction of an image processing apparatus according to a first embodiment of the present invention.

FIG. 1 is a block diagram showing the overall construction of an image processing apparatus according to a first embodiment of the present invention.

In FIG. 1, the image processing apparatus 100 is comprised of a reader section (image input device) 200, a printer section (image output device) 300, a controller section (control device) 110, and an operating section 150. The reader section 200 is comprised of a scanner unit 210 having a function of reading an original and an original feeder unit (IF unit) 250 having a function of conveying the original. The reader section 200 optically reads an image of the original and converts the image into image data.

The printer section 300 is comprised of a feeder unit 311 including a plurality of types of recording sheet cassettes, a marking unit 320 having a function of transferring and fixing image data onto a recording sheet, and a discharge unit 330 having a function of sorting and stapling printed recording sheets and outputting the printed recording sheets to the outside of the apparatus. The printer section 300 conveys a recording sheet, prints image data onto the recording sheet as a visible image, and discharges the recording sheet to the outside of the apparatus.

The controller section 110 is electrically connected to the reader section 200 and the printer section 300, and is also connected to a plurality of information processing apparatuses, i.e., host computers 501 and 502, via an external network 400. The controller section 110 has a copy function of controlling the reader section 200 to read an image of the original as image data and controls the printer section 300 to print the image data on a recording sheet.

The controller section 110 also has a scanner function and a printer function. The scanner function converts the image data read by the reader section 200 into code data and transmits the code data via the network 400 to the host computers 501 and 502. The printer function converts code data received from the host computers 501 and 502 via the network 400 into image data and outputs the image data to the printer section 300.

The operating section 150 connected to the controller section 110 is comprised of a liquid crystal touch panel and serves as a user interface (I/F) for operating the image processing apparatus 100. The network 400 is implemented by an ETHER NET (registered trademark) or the like.

Figure 2:
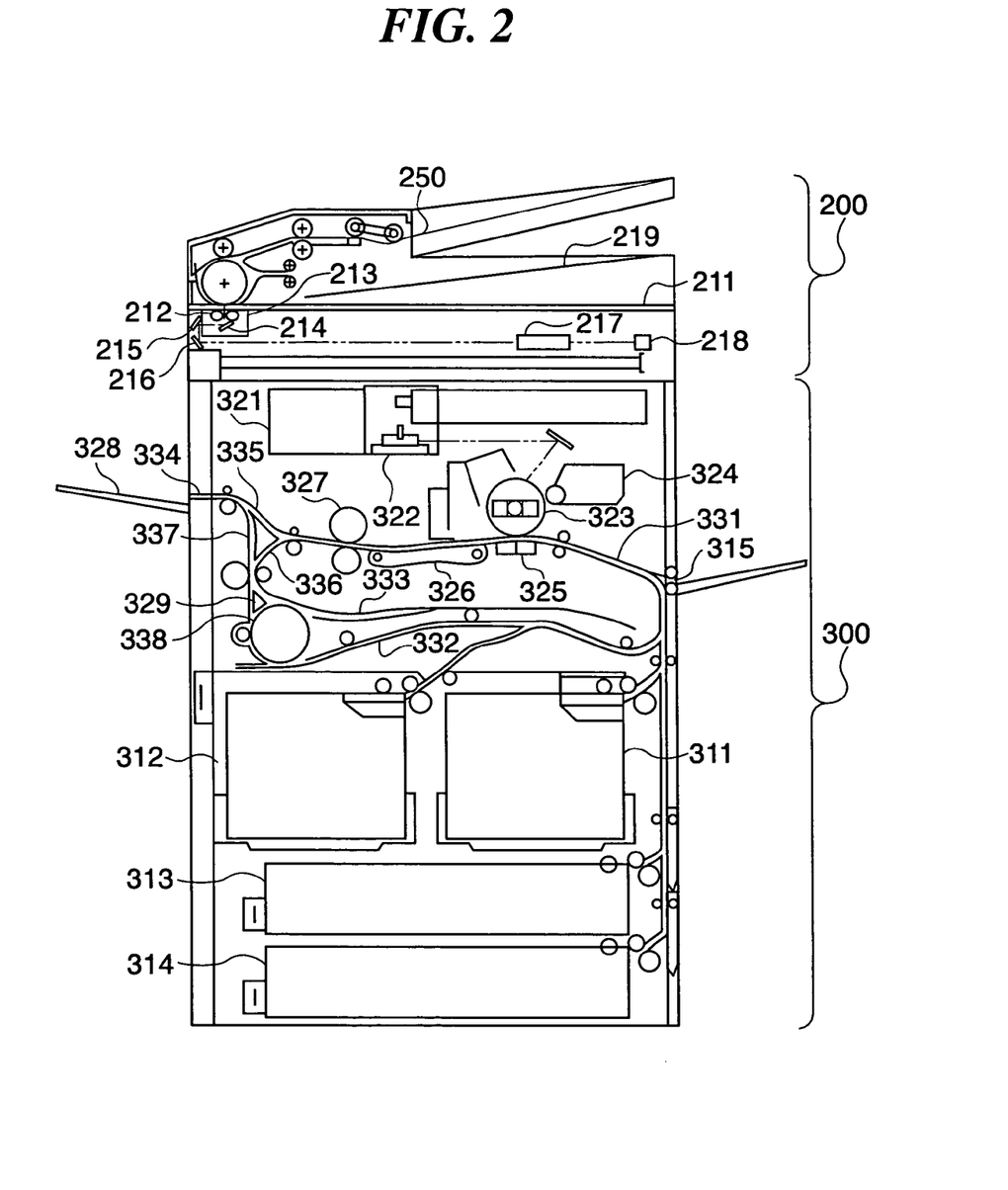
FIG. 2 is a schematic vertical cross-sectional view of the image processing apparatus 100 appearing in FIG. 1.

FIG. 2 is a schematic vertical cross-sectional view of the image processing apparatus 100.

In FIG. 2, the original feeder unit 250 inside the reader section 200 feeds originals sheet by sheet from the top to a platen glass 211, and after an original reading operation is completed, discharges the original on the platen glass 211 to discharge tray 219. When an original has been conveyed onto the platen glass 211, a lamp 212 is turned on, and an optical unit 213 is caused to start moving so that the original is scanned and exposed to light. The light reflected off the original at this time is guided by mirrors 214, 215, 216, and a lens 217 to a CCD image sensor (hereinafter, simply "CCD") 218. In this way, the image of the scanned original is read by the CCD 218. The image data of the original outputted from the CCD 218 is subjected to predetermined processing and is then transferred to the controller section 110.

A laser driver 321 inside the printer section 300 drives a laser emitting section 322 to emit laser light in accordance with the image data outputted from the controller section 110. This laser light is irradiated onto a photosensitive drum 323, so that a latent image is formed on the photosensitive drum 323 in accordance with the laser light. A developer 324 applies a developing material to a part of the photosensitive drum 323 on which the latent image is formed.

In timing synchronized with the start of emission of laser light, a recording sheet is fed from one of cassettes 311, 312, 313, and 314 and a manual feed tray 315 to a transfer section 325 via a conveying path 331 and the developing material that adheres to the photosensitive drum 323 is transferred onto the recording sheet. The recording sheet onto which the developing material has been transferred is conveyed by a conveyor belt 326 to a fixing section 327 and the developing material is then fixed to the recording sheet by the fixing section 327 using heat and pressure. After this, the recording sheet that has passed the fixing section 327 is discharged to a discharge bin 328 via conveying paths 334 and 335. On the other hand, in a case where the recording sheet is discharged to the discharge bin 328 with a printed surface turned upside down, the recording sheet is guided to conveying paths 336 and 338 and from there is conveyed in the opposite direction so as to pass a conveying path 337 and the conveying path 334.

When two-sided recording is set, the recording sheet passes the fixing section 327 and is guided from the conveying path 336 to a conveying path 333 via a flapper 329, is thereafter conveyed in the opposite direction, and is guided to the conveying path 338 and a refeeding conveying path 332 by the flapper 329. The recording sheet guided to the refeeding conveying path 332 passes the conveying path 331 in the timing described above and is fed to the transfer section 325.

Figure 3:
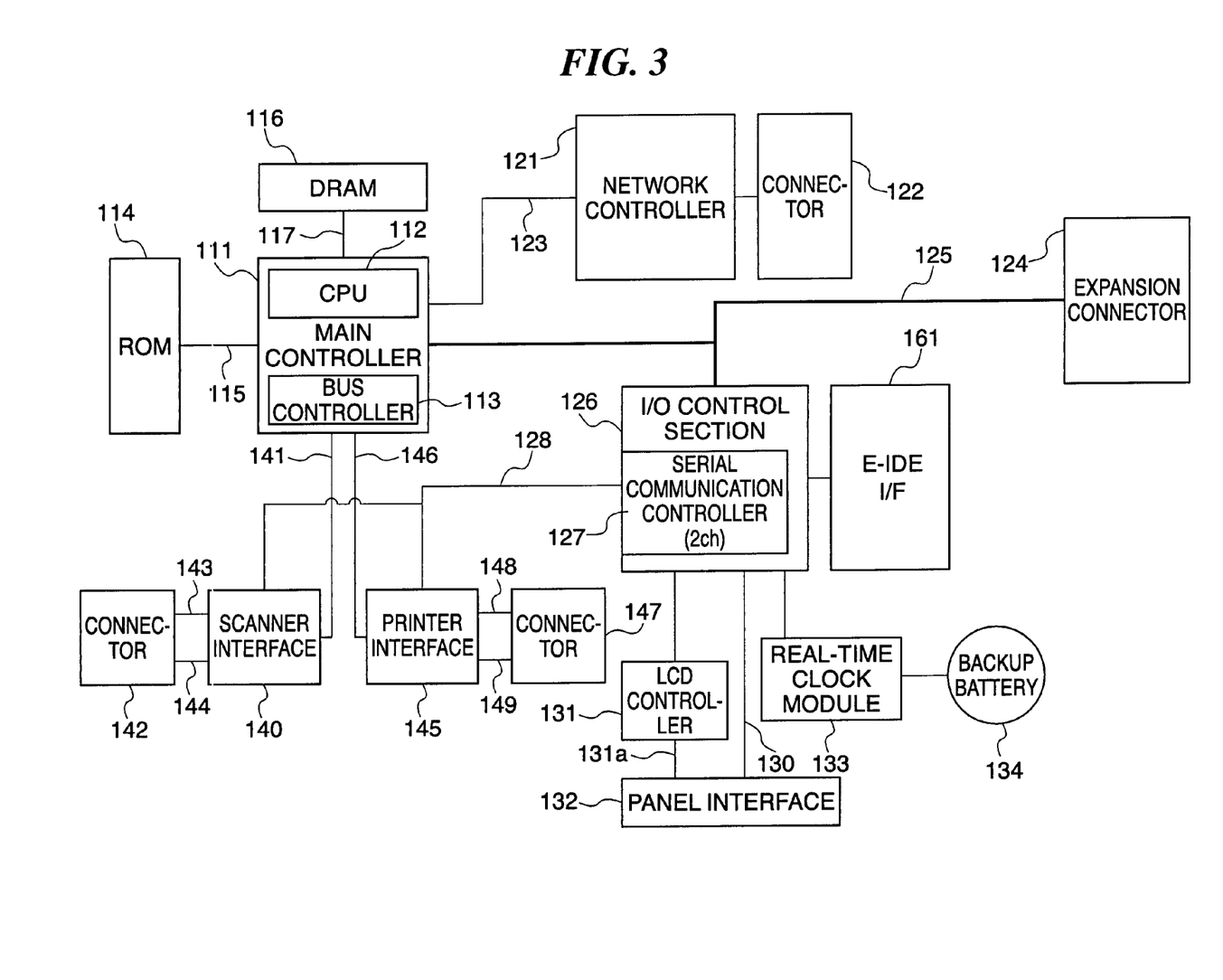
FIG. 3 is a block diagram showing the internal construction of a controller section 110 appearing in FIG. 1.

FIG. 3 is a block diagram showing the internal construction of the controller section 110.

In FIG. 3, a main controller 111 is mainly comprised of a CPU 112, a bus controller 113, and various kinds of interface controller circuits, not shown. The CPU 112 and the bus controller 113 control the entire operation of the controller section 110. The CPU 112 executes processes including a process, described later, based on programs read via a ROM interface 115 from a ROM (Read Only Memory) 114 connected to the main controller 111. An operation of interpreting PDL (Page Description Language) code data received via the network 400 from the host computer 401 or 402 and expanding the PDL code data into raster image data is also described in one of the read programs and is processed by this program. The bus controller 113 controls transfer of data for input and output via various interfaces, and performs control of DMA (Direct Memory Access) data transfer as well as arbitration when there is a bus conflict.

A DRAM (Dynamic RAM) 116 is connected to the main controller 111 via a DRAM interface 117. The DRAM 116 is a work area for operations by the CPU 112 and is used as an area for storing image data. The DRAM 116 is also used as an area for storing print jobs received via the network 400 from the host computer 501, etc., and resource data and the like that have been downloaded via the network 400 from the host computer 501, etc.

A network controller 121 is connected to the main controller 111 via an interface 123 and is connected to an external network via a connector 122. The network can be implemented by an ETHERNET (registered trademark).

A universal high-speed bus 125 is connected to an expansion connector 124 for connecting an expansion board and an I/O control section 126. The universal high-speed bus 125 can be implemented by a PCI (Peripheral Component Interconnect) bus. The I/O control section 126 is provided therein with an a synchronous serial communication controller 127 for two channels, for transmitting and receiving control commands to and from respective CPUs of the reader section 200 and the printer section 300. The controller 127 is connected via an I/O bus 128 to a scanner interface 140 and a printer interface 145, which are both external interface circuits.

A panel interface 132 is connected to the I/O control section 126 via an LCD controller 131 and is connected to the I/O control section 126 via a key input interface 130 for making inputs via hard keys or touch panel keys. The panel interface 132 is provided therein with an interface for performing display on a liquid crystal display section, not shown, on the operating section 150.

The operating section 150 connected to the panel interface 132 is comprised of the liquid crystal display section, not shown, an input device (touch panel keys) realized by a touch panel attached to the liquid crystal display section, and a plurality of hard keys. Signals inputted via the touch panel keys or hard keys are transferred to the CPU 112 via the panel interface 132, etc. The liquid crystal display section displays image data that has been sent from the panel interface 132. The liquid crystal display section also displays functions of the image processing apparatus 100 that are being used, image data, etc.

A real-time clock module 133 updates and stores a date and time that are managed inside the apparatus and is backed up by a backup battery 134. An E-IDE interface 161 is for connection to an external storage device. A hard disk drive or a CD-ROM drive, not shown, is connected via this interface so that programs and image data can be read and written from and into the drive.

Connectors 142 and 147 are connected respectively to the reader section 200 and the printer section 300. The connector 142 is connected to an asynchronous serial interface 143 and a video interface 144, and the connector 147 is connected to an asynchronous serial interface 148 and a video interface 149.

The scanner interface 140 is connected to the reader section 200 via the connector 142 and is also connected to the main controller 111 via a scanner bus 141. The scanner interface 140 has a function of subjecting image data received from the reader section 200 to an optimal binarization according to the contents of processing carried out subsequently and to a magnification process in main and sub scanning directions. The scanner interface 140 also has a function of outputting a control signal, which is generated based on a video control signal sent from the reader section 200, to the scanner bus 141. Data transfer from the scanner bus 141 to the DRAM 116 is controlled by the bus controller 113.

The printer interface 145 is connected to the printer section 300 via the connector 147 and is also connected to the main controller 111 via a printer bus 146. The printer interface 145 has a function of performing a smoothing process on image data that has been outputted from the main controller 111 and outputs the image data to the printer section 300 and also a function of outputting a control signal generated based on a video control signal sent from the printer section 300 to the printer bus 146.

Transfer of raster image data expanded on the DRAM 116 to the printer section 300 is controlled by the bus controller 113, with the data being DMA-transferred to the printer section 300 via the printer bus 146 and the video interface 149.

Figure 4:
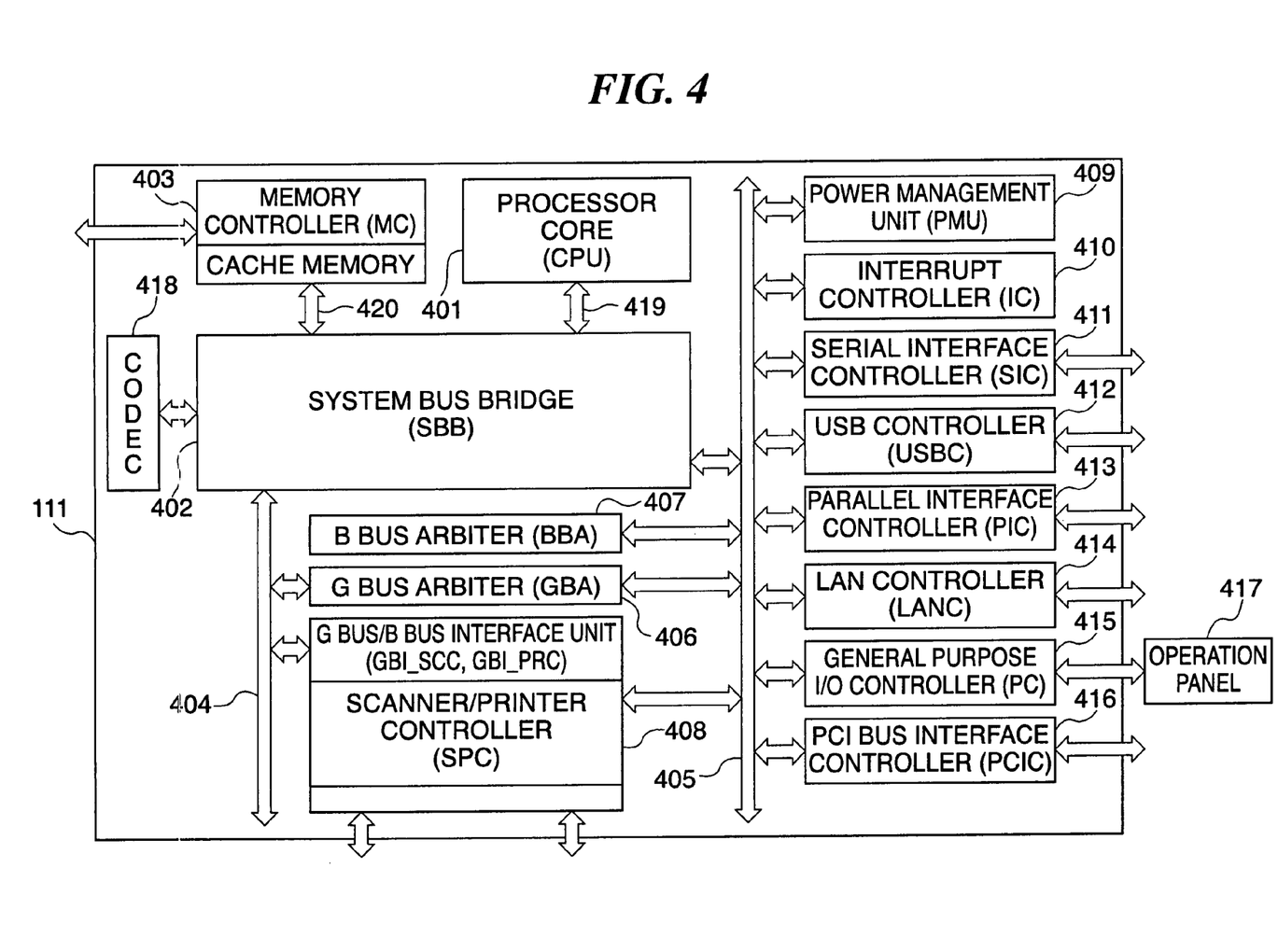
FIG. 4 is a block diagram showing the internal construction of a main controller 111 appearing in FIG. 3.

FIG. 4 is a block diagram showing the internal construction of the main controller 111.

In FIG. 4, a processor core (CPU) 401 is connected to a system bus bridge (SBB) 402 via a 64-bit processor local bus (SC bus) 419. The system bus bridge 402 is a 4×4=64-bit cross bus switch.

The system bus bridge 402 is also connected via a dedicated local bus (MC bus) 420 to a memory controller (MC) 403 that has a cache memory and controls the DRAM 116 and the ROM 114. The system bus bridge 402 is also connected to a graphics bus (G bus) 404 and a B bus (input/output bus) 405, and so is connected to a total of four buses. The system bus bridge 402 is designed such that simultaneous parallel connections can be maintained between these four modules to the greatest possible extent. The system bus bridge 402 is also connected via a CODEC interface to a data compression/expansion unit (CODEC) 418.

The G bus 404 is subjected to cooperative control by a G bus arbiter (GBA) 406 and is connected to a scanner/printer controller (SPC) 408 for connecting to the scanner unit 210 and the printer section 300. The B bus 405 is subjected to cooperative control by a B bus arbiter (BBA) 407 and, aside from the scanner/printer controller 408, is connected to a power management unit (PMU) 409, an interrupt controller (IC) 410, a serial interface controller (SIC) 411 that uses a UART (Universal Asynchronous Receiver Transmitter), a USB (Universal Serial Bus) controller (USBC) 412, a parallel interface controller (PIC) 413 that uses IEEE 1284, a LAN controller (LANC) 414 that uses an ETHERNET (registered trademark), a general purpose I/O controller (PC) 415 that controls touch panel keys, hard keys, etc., and a PCI bus interface controller (PCIC) 416. The general purpose I/O controller (PC) 415 is controlled by an operation panel 417 having a display panel and a keyboard.

The interrupt controller 410 collects interrupts from various functional blocks inside the main controller chip and from outside the chip and redistributes the interrupts as non-maskable interrupts (NMI) and external interrupts on six levels that are supported by the processor core 401. The functional blocks mentioned above include the power management unit 409, the serial interface controller 411, the USB controller 412, the parallel interface controller 413, the LAN controller 414, the general purpose I/O controller 415, the PCI bus interface controller 416, and the scanner/printer controller 408.

Figure 5:
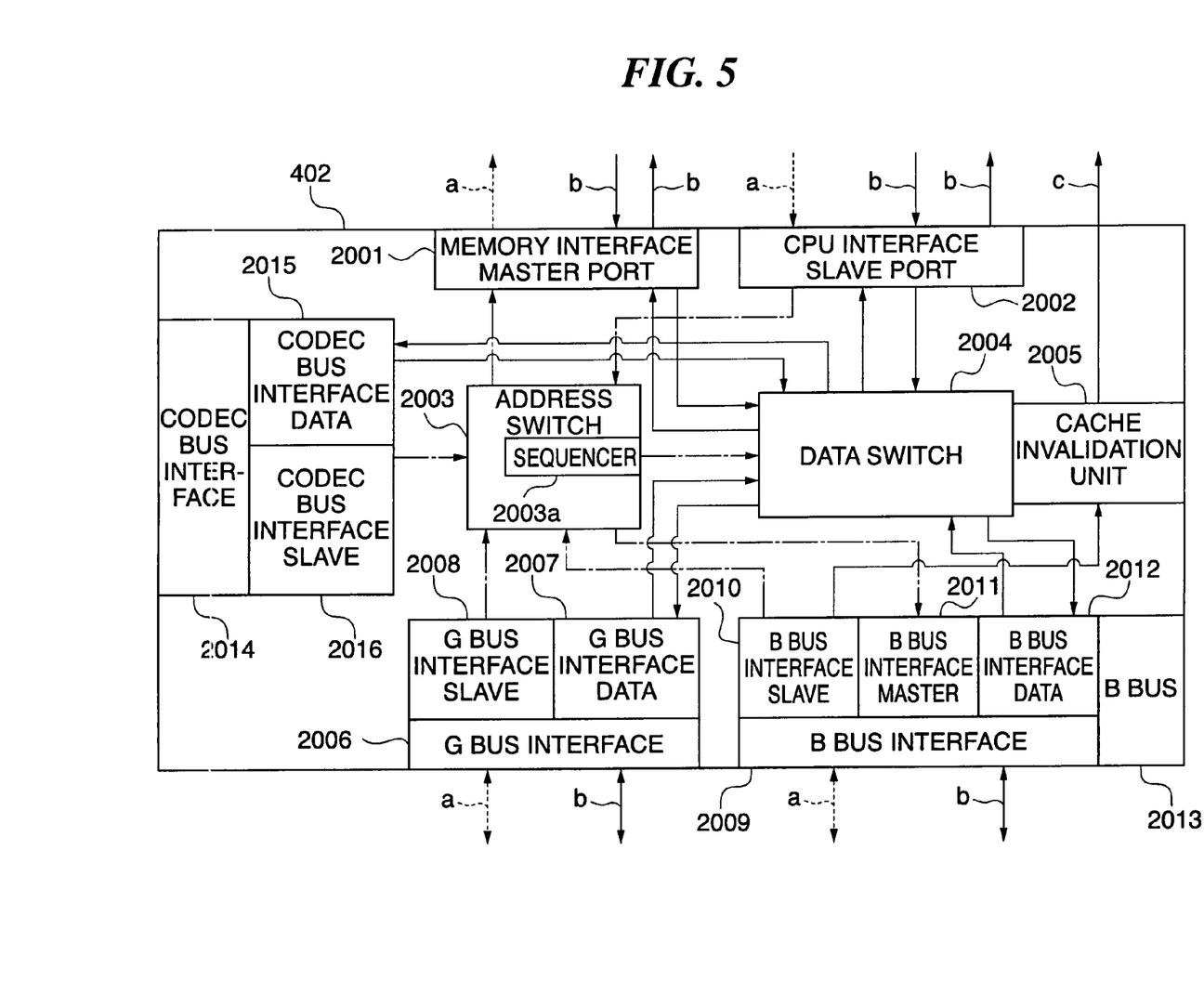
FIG. 5 is a block diagram showing the internal construction of a system bus bridge 402 appearing in FIG. 4.

FIG. 5 is a block diagram showing the internal construction of the system bus bridge 402.

In FIG. 5, the system bus bridge 402 is a multi-channel bidirectional bus bridge that interconnects the B bus 405, the G bus 404, the SC bus 419, and the MC bus 420 using a cross bus switch. By using a cross bus switch, it is possible to simultaneously establish two system connections, and high-speed data transfers with high parallelism can be realized. Symbol "a" in FIG. 5 represents a flow of an address signal, symbol "b" represents a flow of a data signal, and symbol "c" represents a cache invalidation interface.

The system bus bridge 402 is comprised of a B bus interface 2009 for connecting to the B bus 405, a G bus interface 2006 for connecting to the G bus 404, a CPU interface slave port 2002 for connecting to the processor core 401, a memory interface master port 2001 for connecting to the memory controller 403, a CODEC bus interface 2014 for connecting to the data compression/expansion unit 418, an address switch 2003 for connecting to an address bus, a data switch 2004 for connecting to a data bus, and a cache invalidation unit 2005 for invalidating a cache memory of the processor core 401.

The B bus interface 2009 is comprised of a B bus interface slave 2010, a B bus interface master 2011, B bus interface data 2012, and a B bus 2013. The G bus interface 2006 is comprised of a G bus interface slave 2008 and G bus interface data 2007. The CODEC bus interface 2014 is comprised of CODEC bus interface data 2015 and a CODEC bus interface slave 2016. A sequencer 2003a is internally provided inside the address switch 2003.

The PCI bus interface controller 416 in FIG. 4 is a block that acts as an interface between the B bus 405, which is a general purpose I/O bus inside the main controller, and a PCI bus, which is an external I/O bus located outside the chip.

Arbitration for the G bus 404 is performed according to a central arbitration method and includes a request signal and a grant signal which are dedicated to each of bus masters. Here, the G bus arbiter 406 can program the arbitration control method. As the method of giving priority to the bus masters, it is possible to designate one of an impartial arbitration mode, in which the bus is used with the same priority being given to every bus master, and a prioritized arbitration mode, in which priority is given to one of the bus masters which is allowed to use the bus with priority.

The B bus arbiter 407 receives a bus usage request for the B bus 405 and after arbitration grants usage authorization to the selected bus master and inhibits bus accesses from being made by two or more bus masters simultaneously. The arbitration method has three levels of priority and is configured so as to programmably assign the respective priorities to a plurality of bus masters.

Figure 6:
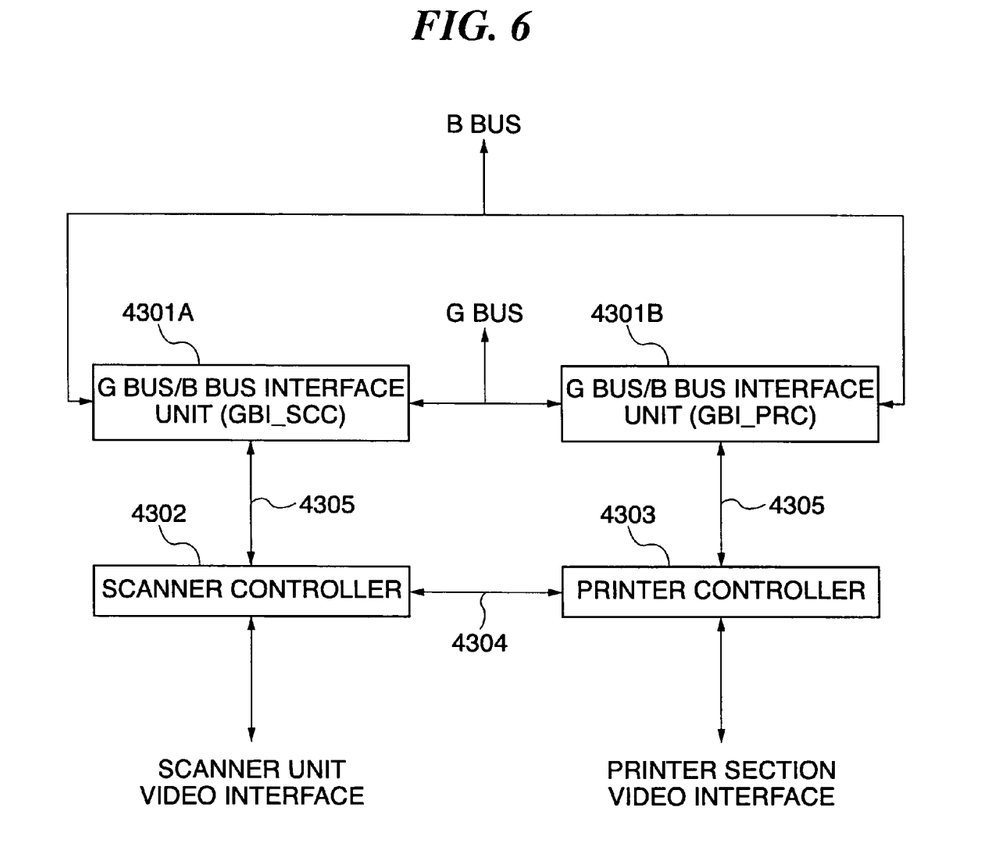
FIG. 6 is a block diagram showing the internal construction of a scanner/printer controller 408 appearing in FIG. 4.

FIG. 6 is a block diagram showing the internal construction of the scanner/printer controller 408.

The scanner/printer controller 408 is connected to the scanner unit 210 and the printer section 300 via the video interfaces 144 and 149, respectively, and is a block that acts as an interface for the G bus 404 and the B bus 405.

A scanner controller 4302 is connected to the scanner unit 210 and the video interface 144 and performs operation control and data transfer control thereof. A G bus/B bus interface unit (GBI) 4301A is connected to the scanner controller 4302 via an interface bus 4305 and performs data transfer and read/write of registers.

A printer controller 4303 is connected to the printer section 300 and the video interface 149 and performs operation control and data transfer control thereof. A G bus/B bus interface unit (GBI) 4301B is connected to the printer controller 4303 via the interface bus 4305 and performs data transfer and read/write of registers.

The G bus/B bus interface unit (GBI) 4301A connects the scanner controller 4302 to the G bus 404 or the B bus 405. The G bus/B bus interface unit (GBI) 4301B connects the printer controller 4303 to the G bus 404 or the B bus 405. The G bus/B bus interface unit (GBI) 4301A and the G bus/B bus interface unit (GBI) 4301B are connected respectively to the scanner controller 4302 and the printer controller 4303 independently, and are both connected to the G bus 404 and the B bus 405.

A CP bus 4304 directly connects the scanner controller 4302 and the printer controller 4303 for transferring image data and synchronization signals for horizontal/vertical synchronization.

The main controller 111 is a large-scale ASIC (Application-Specific Integrated Circuit) that is provided therein with the CPU 112. This means that when all of the internal logic elements or units operates simultaneously, a large amount of heat is generated, so that there is the risk of the chip itself being destroyed. To prevent this, the main controller 111 performs power management on a block-by-block basis and also monitors the power consumption of the entire chip.

Power management is performed separately for respective blocks of the main controller 111. Information on the power consumption of respective blocks is gathered in the power management unit (PMU) 409 as power management levels. The power management unit 409 totals the power consumed by the respective blocks of the main controller 111 and collectively monitors the power consumed by the respective blocks so that the total does not exceed a power consumption limit.

Next, as a first example, exclusive control that performs downloading of resource data depending upon the existence of a print job will be described with reference to FIG. 7.

Figure 7:
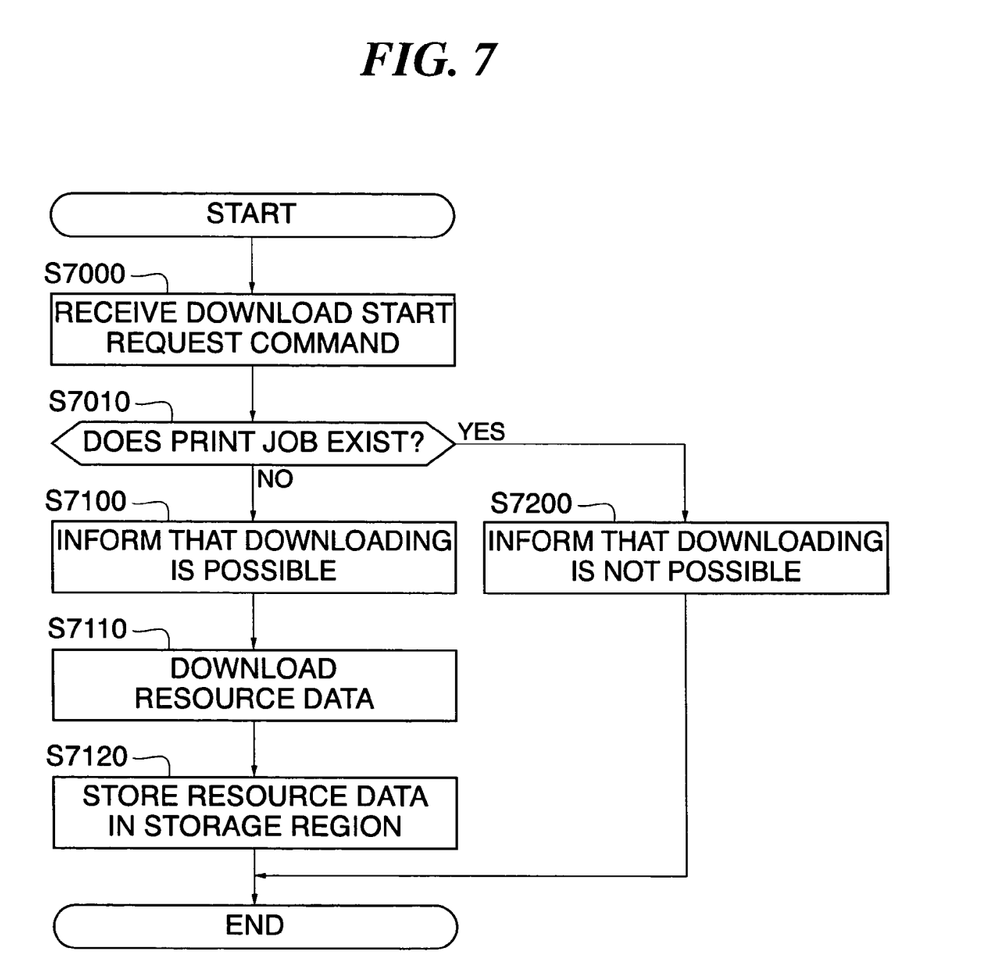
FIG. 7 is a flowchart showing an exclusive control process executed by the controller section 110 according to the first embodiment.

FIG. 7 is a flowchart showing an exclusive control process that is executed by the controller section 110.

In FIG. 7, in a step S7000, a download start request command for resource data is received from the host computer 501, which is one of the plurality of host computers connected to the network 400. This download start request command requests downloading (transmission) of resource data that is transmitted from the host computer 501.

Next, when the download start request command has been received, in a step S7010 it is determined whether there exists a print job that has been received from the host computer 502 that is another computer of the plurality of host computers, that is, it is determined whether a print job is stored in the DRAM 116. When it is determined that a print job exists, the process proceeds to a step S7200, while when no print job exists, the process proceeds to a step S7100.

In the step S7100, the host computer 501 that transmitted the download start request command is informed as a response that it is possible to download the resource data. After the response is transmitted, in a step S7110 the network controller 121 and related devices are controlled to download the resource data from the host computer 501. After the resource data has been downloaded, in a step S7120 the resource data that has been downloaded is stored in a resource data storage region and the present process is completed. The "resource data storage region" here refers to a hard disk drive or the like that is connected to the controller section 110 via the E-IDE interface 161 in FIG. 3, but may alternatively be the DRAM 116.

In the step S7200, the host computer 501 that transmitted the download start request command is informed as a response that it is not possible to download the resource data, and the present process is completed.

According to the present embodiment described above, when a download start request command for resource data is received (step S7000), and a print job exists (YES in the step S7010), the host computer that transmitted the download start request command is informed that downloading is not possible. As a result, resource data is not downloaded from a host computer when a print job is being executed, so that problems such as a change of fonts midway through printing can be avoided.

Next, a second embodiment of the present invention will be described. The second embodiment is different from the above described first embodiment only in the exclusive control process executed by the controller section 110, but the hardware configuration is identical with that described with reference to FIGS. 1 to 6.

Figure 8:
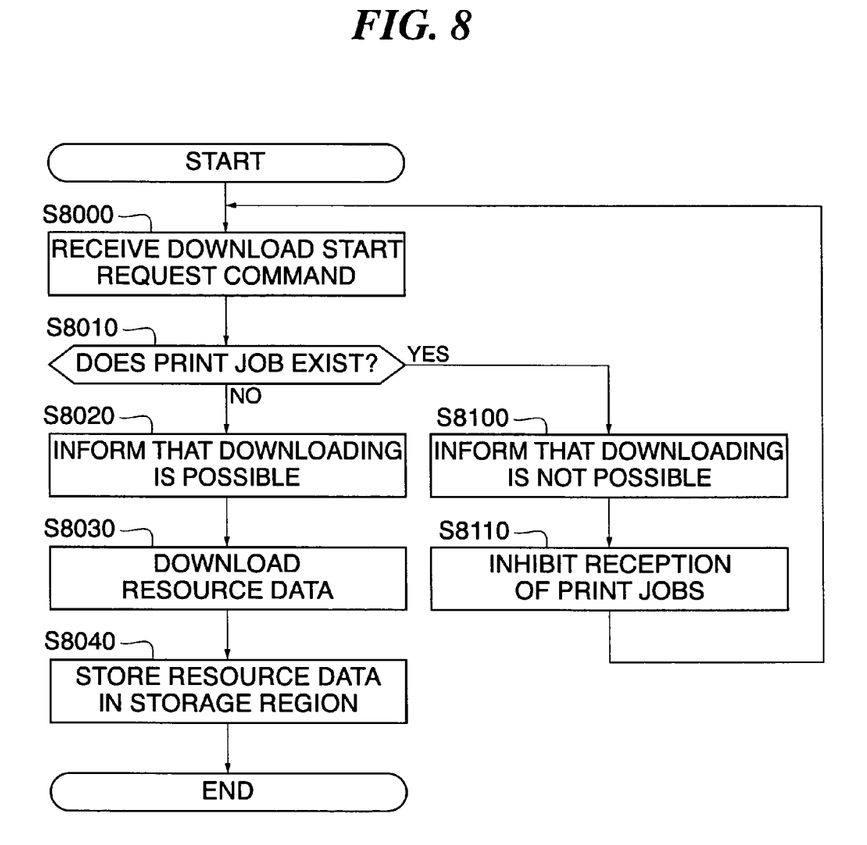
FIG. 8 is a flowchart showing an exclusive control process executed by the controller section 110 according to a second embodiment of the present invention.

FIG. 8 is a flowchart showing the exclusive control process executed by the controller section 110 according to the second embodiment.

In FIG. 8, in a step S8000 a download start request command for resource data is received from the host computer 501, which is one of the plurality of host computers connected to the network 400. This download start request command requests downloading (transmission) of resource data that is transmitted from the host computer 501.

Next, when the download start request command has been received, in a step S8010 it is determined whether there exists a print job that has been received from the host computer 502 that is another computer of the plurality of host computers, that is, it is determined whether a print job is stored in the DRAM 116. When it is determined that a print job exists, the process proceeds to a step S8100, while when there is no print job, the process proceeds to a step S8020.

In the step S8020, the host computer 501 that transmitted the download start request command is informed as a response that it is possible to download the resource data. After the response is transmitted, in a step S8030 the network controller 121 and related devices are controlled to download the resource data from the host computer 501. After the resource data has been downloaded, in a step S8040 the resource data that has been downloaded is stored in a resource data storage region and the present process is completed. The "resource data storage region" here refers to a hard disk drive or the like that is connected to the controller section 110 via the E-IDE interface 161 in FIG. 3, but may alternatively be the DRAM 116.

In the step S8100, the host computer 501 that transmitted the download start request command is informed as a response that it is not possible to download the resource data. After the response is transmitted, in a step S8110 the network controller 121 and related devices are controlled so as to inhibit print jobs from being received, and the process returns to the step S8000.

According to the second present embodiment described above, when a download start request command for resource data is received (step S8000), and a print job exists (YES in the step S8010), the host computer that transmitted the download start request command is informed that downloading is not possible, and further the reception of a subsequent print job is rejected. As a result, resource data is not downloaded from a host computer when a print job is being executed, so that problems such as a change of fonts midway through printing can be avoided.

Further, even if the downloading of resource data is not possible due to a print job being executed, after the execution of the print job is completed, it will be possible to download the resource data when a download start request command is received again, so that it is possible to download resource data in between print jobs, which raises the usage efficiency of the image processing apparatus 100.

Next, a third embodiment of the present invention will be described. The third embodiment is different from the above described first embodiment only in the exclusive control process executed by the controller section 110, but the hardware configuration is identical with that described with reference to FIGS. 1 to 6.

Figure 9:
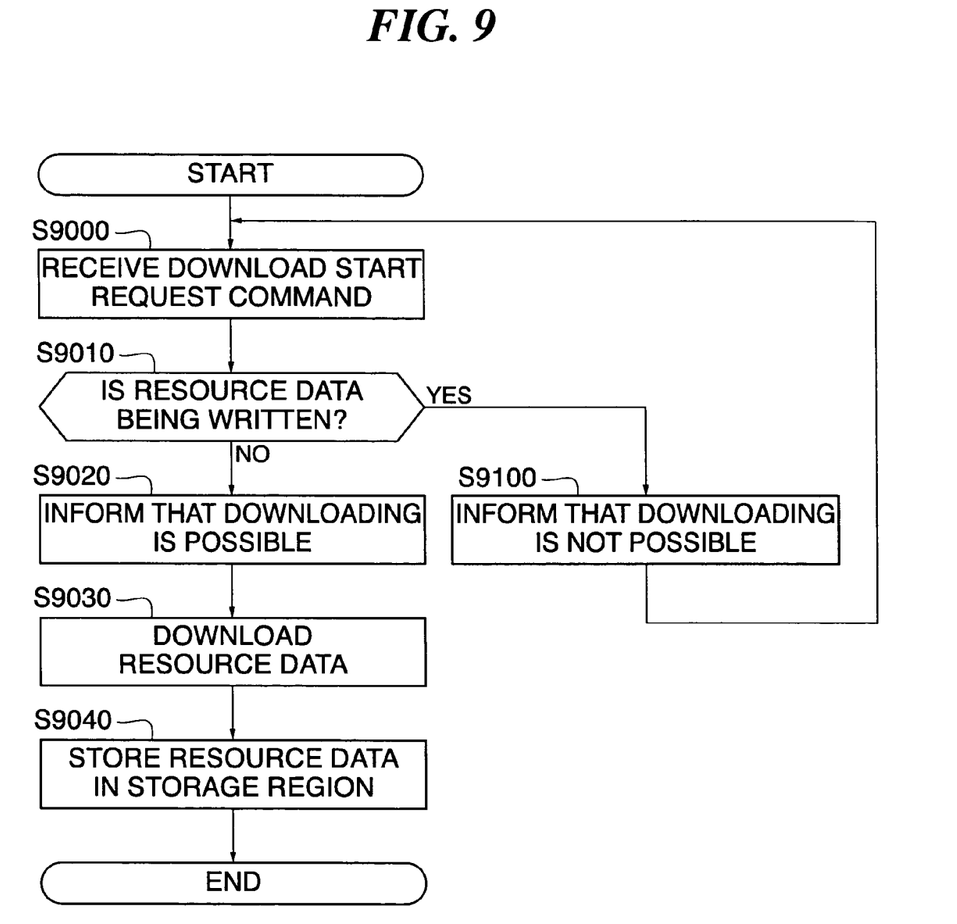
FIG. 9 is a flowchart showing an exclusive control process executed by the controller section 110 according to a third embodiment of the present invention.

FIG. 9 is a flowchart showing an exclusive control process executed by the controller section 110 according to the third embodiment.

In FIG. 9, in a step S9000 a download start request command for resource data is received from the host computer 501, which is one of the plurality of host computers connected to the network 400. This download start request command requests downloading (transmission) of resource data that is transmitted from the host computer 501.

Next, when the download start request command has been received, in a step S9010 it is determined whether resource data previously downloaded from the host computer 502 is presently being written into a resource data storage region. The "resource data storage region" here refers to a hard disk drive or the like that is connected to the controller section 110 via the E-IDE interface 161 in FIG. 3, but may alternatively be the DRAM 116.

When it has been determined in the step S9010 that resource data is being written, the process proceeds to a step S9100, while when it has been determined that resource data is not being written, the process proceeds to a step S9020.

In the step S9020, the host computer 501 that transmitted the download start request command is informed as a response that it is possible to download the resource data. After the response is transmitted, in a step S9030 the network controller 121 and related devices are controlled to download the resource data from the host computer 501. After the resource data has been downloaded, in a step S9040, the downloaded resource data is stored in the resource data storage region mentioned above and the present process is completed.

In the step S9100, the host computer 501 that transmitted the download start request command is informed as a response that it is not possible to download the resource data. After the host computer 501 has been informed of the response, the main controller 111 returns to the step S9000.

According to the third embodiment described above, after a download start request command for resource data has been received (step S9000), even if a subsequent download start request command is received) the host computer that transmitted the download start request command is informed that downloading is not possible so that the downloading of resource data for the subsequent command is not executed while the resource data that is downloaded first is being written into the resource data storage region. As a result, even in a case where resource data is downloaded from a plurality of host computers to the image processing apparatus 100, it is possible to avoid a situation where pieces of resource data are corrupted due to the pieces of resource data being simultaneously downloaded, and the resource data can be properly protected against corruption.

Although in the above embodiments, the image processing apparatus 100 is described as being a multi-function appliance having print and copy functions, it goes without saying that the image processing apparatus 100 may be a multi-function appliance having a function of transmitting and receiving facsimiles, electronic mail, and the like, or may simply be a printer.

It is to be understood that the present invention may also be accomplished by supplying a system or an apparatus with a storage medium in which a program code of software which realizes the functions of any of the above described embodiments (program code corresponding to any of the flowcharts of FIGS. 7 to 9) is stored, and causing a computer (or CPU or MPU) of the system or apparatus to read out and execute the program code stored in the storage medium.

In this case, the program code may be supplied directly from a storage medium on which the program code is stored, or from a computer, database, or the like, not shown, that is connected via the Internet, a commercial network, a local area network, or the like.

The above program code may realize the functions of any of the above embodiments on a computer, and may be in the form of object code, a program that is executed by an interpreter, script data that is supplied to an OS (Operating System), or the like.

It is to be understood that the present invention may also be accomplished by supplying a computer with a storage medium in which a program code of software which realizes the functions of any of the above described embodiments is stored, and causing the computer or CPU to read out and execute the program code stored in the storage medium.

In the above embodiments, a program is stored on a hard disk drive, but the present invention is not limited to this, and the program may be stored in an external storage apparatus or storage medium connected via the E-IDE interface 161 of FIG. 3.

Examples of the storage medium for supplying the program code include a RAM, an NV-RAM, a flexible disk, an optical disk, a magneto-optical disk, an MO, a CD-ROM, a CD-R, a CD-RW, a DVD-ROM, a DVD-RAM, a DVD-RW, a DVD+RW, a magnetic tape, a nonvolatile memory card, and a ROM.

What is claimed is:

1. An image processing apparatus that receives a download start request for resource data used for a print job and then downloads the resource data, the image processing apparatus comprising:

a communication unit configured to communicate with each of a plurality of information processing apparatuses;

a storage unit configured to store at least one print job received by said communication unit from at least one of the plurality of information processing apparatuses;

a determination unit configured to determine whether a print job received by said communication unit from at least one of the plurality of information processing apparatuses exists in said storage unit; and a control unit configured to be operable when said communication unit receives a download start request for resource data from one of the plurality of information processing apparatuses and said determination unit determines that the received print job exists in said storage unit, to control said communication unit to inform the one information processing apparatus from which said communication unit has received the download start request for the resource data of a first response indicating that downloading of the resource data is not possible, and when said communication unit receives the download start request for the resource data from one of the plurality of information processing apparatuses and said determination unit determines that the received print job does not exist in said storage unit, to control said communication unit to inform the one information processing apparatus from which said communication unit has received the download start request for the resource data of a second response indicating that downloading of the resource data is possible, wherein the resource data is downloaded from the one information processing apparatus to the image processing apparatus after the second response is informed from the image processing apparatus to the one information processing apparatus.

2. An image processing apparatus according to claim 1, wherein when said communication unit receives the download start request and said determination unit determines that the received print job does not exist in said storage unit, said control unit controls said communication unit to inform the one information processing apparatus of the second response and then controls said communication unit to download the resource data.

3. An image processing apparatus according to claim 1, wherein when said communication unit has informed the one information processing apparatus from which said communication unit has received the download start request for resource data that downloading of the resource data is not possible, said control unit controls said communication unit so as not to receive another print job.

4. An image processing apparatus according to claim 2, further comprising:
   resource data storage unit configured to store the resource data that has been downloaded from the one information processing apparatus to the image processing apparatus,
   wherein the communication unit downloads the resource data, which is then stored in the resource data storage unit.

5. A method of controlling an image processing apparatus that processes a print job using resource data, the image processing apparatus including a storage unit that stores at least one print job received from at least one of a plurality of information processing apparatuses, the method comprising steps of:
   receiving a download start request for resource data from one of the plurality of information processing apparatuses;
   determining whether a print job received from at least one of the plurality of information processing apparatuses exists in the storage unit;
   when the download start request for resource data is received and the received print job exists in the storage unit, informing the one information processing apparatus from which the download start request for the resource data has been received a first response indicating that downloading of the resource data is not possible; and
   when the download start request for resource data is received and the received print job does not exist in the storage unit, informing the one information processing apparatus from which the download start request for the resource data has been received a second response indicating that downloading of the resource data is possible, and downloading the resource data from the one information processing apparatus to the image processing apparatus after the second response is informed from the image processing apparatus to the one information processing apparatus.

6. A control method according to claim 5, further comprising the step of downloading the resource data when the download start request is received and the received print job does not exist in the storage unit.

7. A control method according to claim 5, wherein the image processing apparatus does not receive another print job when the first response is informed to the one information processing apparatus from which the download start request for resource data has been received.

8. A control method according to claim 6, further comprising the step of storing the resource data in a resource data storage area, after downloading the resource data.

9. A non-transitory computer-readable medium storing a computer program that executes a method of controlling an image processing apparatus that processes a print job using resource data, the image processing apparatus including a storage unit that stores at least one print job received from at least one of a plurality of information processing apparatuses, the method comprising steps of:
   receiving a download start request for resource data from one of the plurality of information processing apparatuses;
   determining whether a print job received from at least one of the plurality of information processing apparatuses exists in the storage unit;
   when the download start request for resource data is received and the received print job exists in the storage unit, informing the one information processing apparatus from which the download start request for the resource data has been received a first response indicating that downloading of the resource data is not possible; and
   when the download start request for resource data is received and the received print lob does not exist in the storage unit, informing the one information processing apparatus from which the download start request for the resource data has been received a second response indicating that downloading of the resource data is possible, and downloading the resource data from the one information processing apparatus to the image processing apparatus after the second response is informed from the image processing apparatus to the one information processing apparatus.

10. A non-transitory computer-readable medium according to claim 9, the method further comprising downloading the resource data when the download start request is received and the received print job does not exist in the storage unit.

11. A non-transitory computer-readable medium according to claim 9, wherein the image processing apparatus does not receive another print job when the first response is informed to the one information processing apparatus from which the download start request for resource data has been received.

* * * * *